US011504844B2

(12) United States Patent
Murali et al.

(10) Patent No.: US 11,504,844 B2
(45) Date of Patent: Nov. 22, 2022

(54) MANEUVERING COLLABORATIVE DEVICES FOR A RESCUE MISSION

(71) Applicant: International Business Machines Corporation, Armonk, NY (US)

(72) Inventors: Srikanth K. Murali, Bangalore (IN); Padmanabha Venkatagiri Seshadri, Mysore (IN); Vijay Kumar Ananthapur Bache, Bangalore (IN); Vijay Ekambaram, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 906 days.

(21) Appl. No.: 16/253,272

(22) Filed: Jan. 22, 2019

(65) Prior Publication Data
US 2020/0230805 A1    Jul. 23, 2020

(51) Int. Cl.
*G06F 7/00* (2006.01)
*B25J 9/00* (2006.01)
*G05B 19/4155* (2006.01)

(52) U.S. Cl.
CPC ........ *B25J 9/0084* (2013.01); *G05B 19/4155* (2013.01); *G05B 2219/40276* (2013.01)

(58) Field of Classification Search
CPC . B25J 9/0084; B25J 9/009; B25J 18/06; B25J 9/1625; G05B 19/4155; G05B 2219/40276; G05B 2219/39146; G05B 2219/39168; G05B 2219/40253; G05D 1/0206

USPC ......................................... 700/245, 248, 253
See application file for complete search history.

(56) References Cited

U.S. PATENT DOCUMENTS 9,464,642 B2    10/2016  Ilievski et al.
9,506,455 B2    11/2016  Mazzeo et al.
2020/0230805 A1*  7/2020  Murali ............... G05B 19/4155

FOREIGN PATENT DOCUMENTS

CN    106218748 A    12/2016

OTHER PUBLICATIONS

Cila Warncke, "Robots—The Future of Flood Fighting?", Feb. 28, 2014, 2 pages.

* cited by examiner

*Primary Examiner* — Yolanda R Cumbess
(74) *Attorney, Agent, or Firm* — Rakesh Roy; Hunter E. Webb; Keohane & D'Alessandro, PLLC (57) ABSTRACT

Approaches presented herein enable maneuvering collaborative robots to rescue persons in a hydrological disaster. A plurality of robots are dispersed in a body of water to spread out and seek victims using cooperative foraging techniques within resource constraints. A location of victims located by a robot using sensing techniques is communicated to other robots. A situational assessment is performed using victim location information to determine a number of robots to deploy to the location. The deployed robots are directed to perform coordinated maneuvers to create a connected floatation unit to support floatation of victims for rescue.

20 Claims, 9 Drawing Sheets

MANEUVERING COLLABORATIVE DEVICES FOR A RESCUE MISSION

TECHNICAL FIELD

The present invention relates generally to robotics and, more specifically, to maneuvering collaborative robots to rescue persons in a hydrological disaster.

BACKGROUND

Hydrological disasters such as flooding are no longer limited to people living on the flood plains, as can be seen in more recent cases affecting urban areas. Search and rescue missions in flooded areas, especially in urban centers, can be highly risky and should be carried out swiftly and accurately to ensure the safety of rescue crews and casualties. In many cases, robots have been employed to assist in these operations. A robot is a programmable mechanical device that can perform tasks and interact with its environment, without the aid of human interaction.

Robotics is the science and technology behind the design, manufacturing, and application of robots. Soft robotics is the specific subfield of robotics dealing with constructing robots from highly compliant materials, similar to those found in living organisms. Soft robotics draws heavily from the way in which living organisms move and adapt to their surroundings. In contrast to robots built from rigid materials, soft robots allow for increased flexibility and adaptability for accomplishing tasks, as well as improved safety when working around humans. The advent of soft robotics has provided an opportunity to introduce autonomous agents that can provide search and rescue services in a cost-effective and safe manner.

SUMMARY

Approaches presented herein enable maneuvering collaborative robots to rescue persons in a hydrological disaster. A plurality of robots are dispersed in a body of water to spread out and seek victims using cooperative foraging techniques within resource constraints. A location of victims located by a robot using sensing techniques is communicated to other robots. A situational assessment is performed using victim location information to determine a number of robots to deploy to the location. The deployed robots are directed to perform coordinated maneuvers to create a connected floatation unit to support floatation of victims for rescue.

One aspect of the present invention includes a method for maneuvering collaborative robots for a rescue mission, the method comprising: releasing a plurality of robots in a body of water; detecting, by a robot among the plurality of robots, a plurality of persons in a location of the body of water; performing, based on the number of persons and the location, a situational assessment to derive a number of robots to deploy to the location; deploying, consistent with the derived number, robots to the location; and coordinating maneuvers among the deployed robots to create a connected floatation unit to support floatation of the plurality of persons.

Another aspect of the present invention includes a computer system for maneuvering collaborative robots to rescue persons in a hydrological disaster, the computer system comprising: a memory medium comprising program instructions; a bus coupled to the memory medium; and a processor, for executing the program instructions, coupled to a chain navigation engine via the bus that when executing the program instructions causes the system to: release a plurality of robots in a body of water; detect, by a robot among the plurality of robots, a plurality of persons in a location of the body of water; perform, based on the number of persons and the location, a situational assessment to derive a number of robots to deploy to the location; deploy, consistent with the derived number, robots to the location; and coordinate maneuvers among the deployed robots to create a connected floatation unit to support floatation of the plurality of persons.

Yet another aspect of the present invention includes a computer program product for maneuvering collaborative robots to rescue persons in a hydrological disaster, the computer program product comprising a computer readable hardware storage media, and program instructions stored on the computer readable storage media, that cause at least one computer device to: release a plurality of robots in a body of water; detect, by a robot among the plurality of robots, a plurality of persons in a location of the body of water; perform, based on the number of persons and the location, a situational assessment to derive a number of robots to deploy to the location; deploy, consistent with the derived number, robots to the location; and coordinate maneuvers among the deployed robots to create a connected floatation unit to support floatation of the plurality of persons.

Still yet, any of the components of the present invention could be deployed, managed, serviced, etc., by a service provider who offers to implement passive monitoring in a computer system.

Embodiments of the present invention also provide related systems, methods, and/or program products.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission, or viewing devices. The embodiments are not limited in this context.

As stated above, embodiments described herein provide for maneuvering collaborative robots (e.g., soft robots) to rescue persons in a hydrological disaster. A plurality of robots are dispersed in a body of water to spread out and seek victims using cooperative foraging techniques within resource constraints. A location of victims located by a robot using sensing techniques is communicated to other robots. A situational assessment is performed using victim location information to determine a number of robots to deploy to the location. The deployed robots are directed to perform coordinated maneuvers to create a connected floatation unit to support floatation of victims for rescue.

Figure 1:
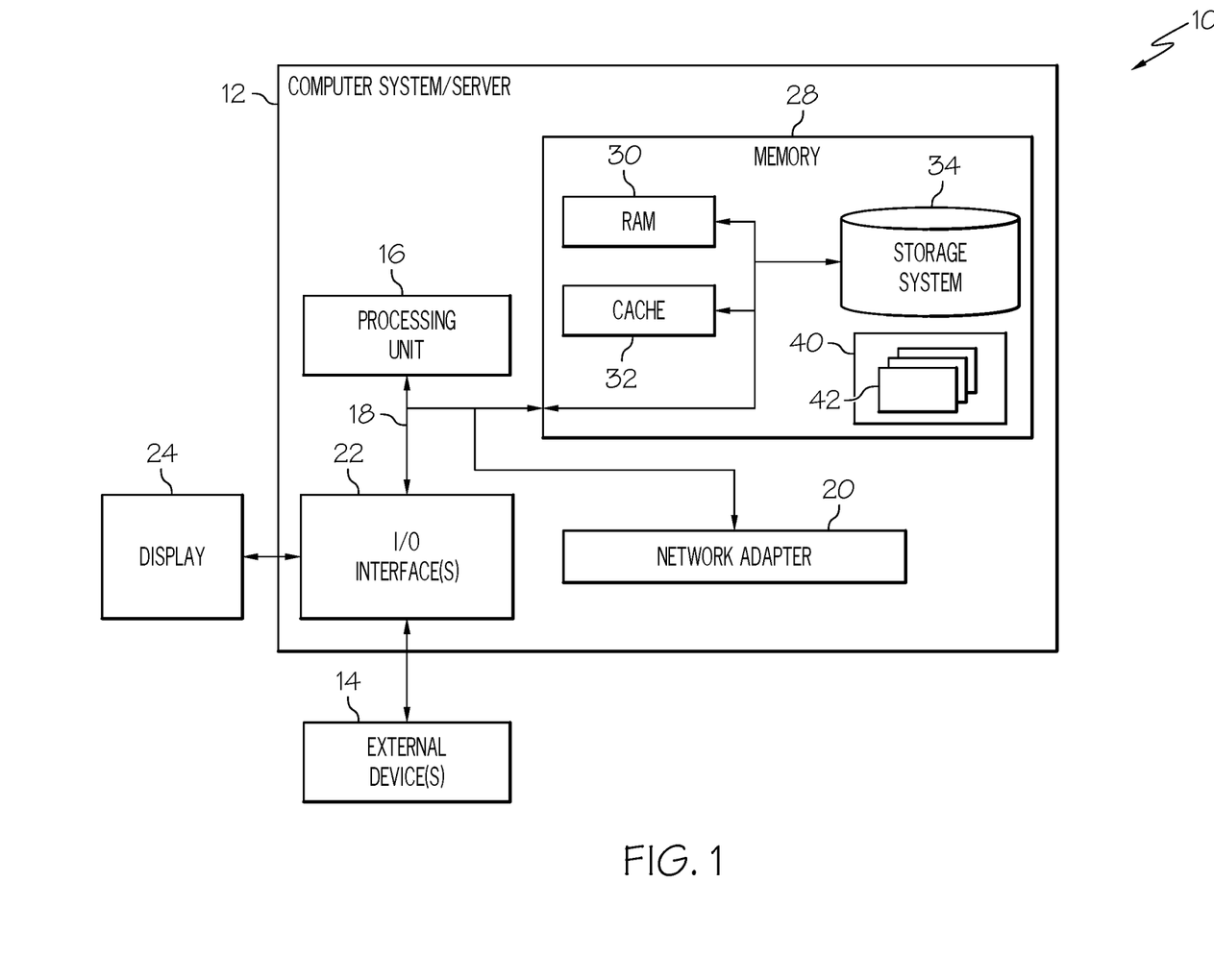
FIG. 1 shows an architecture in which the invention may be implemented according to illustrative embodiments.

Referring now to FIG. 1, a computerized implementation 10 of an embodiment for maneuvering collaborative soft robots to rescue persons in a hydrological disaster will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system/server 12 is intended to demonstrate that some or all of the components of implementation 10 could be deployed, managed, serviced, etc., by a service provider who offers to implement, deploy, and/or perform the functions of the present invention for others.

Computer system/server 12 is intended to represent any type of computer system that may be implemented in deploying/realizing the teachings recited herein. Computer system/server 12 may be described in the general context of computer system/server executable instructions, such as program modules, being executed by a computer system. Generally, program modules may include routines, programs, objects, components, logic, data structures, and so on, that perform particular tasks or implement particular abstract data types. In this particular example, computer system/server 12 represents an illustrative system for maneuvering collaborative soft robots to rescue persons in a hydrological disaster. It should be understood that any other computers implemented under the present invention may have different components/software, but can perform similar functions.

Computer system/server 12 in computerized implementation 10 is shown in the form of a general-purpose computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for maneuvering collaborative soft robots to rescue persons in a hydrological disaster, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

The inventors of the present invention have found that soft robots can be useful in performing delicate tasks where a hard bodied machine would fail or tasks where a metallic or plastic robot would present a danger to humans. A soft robot can handle something very delicate, as well as move and conform its body to get into tight spaces, such as in a search and rescue mission. Embodiments of the present invention provide a hybrid unit which has a soft robotic expandable, or growing, body sandwiching a fixed, or rigid, body control and coordination unit. The soft robotic body is extensible, foldable, and involves a fully controllable surface grappling feature to operate in formation with its peers to rescue persons in a hydrological disaster scenario. To this end, the invention focuses on the use of selectively enabled electromagnetic grains embedded on an expandable body segment of a soft robot for surface grappling. Furthermore, the focus includes a collaborative maneuvering method used to construct compound floatation units from individual soft robots through repeated application of maneuvers such as extension, seek-to-connect (or seek-to-mate), and surface grappling.

Figure 2:
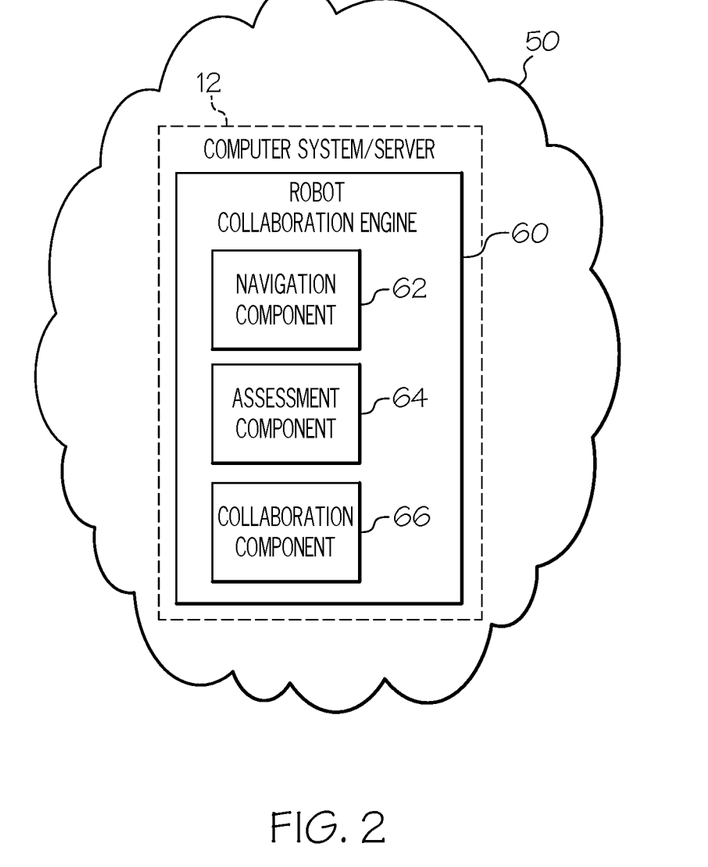
FIG. 2 shows a system diagram describing the functionality discussed herein according to illustrative embodiments.

Referring now to FIG. 2, a system diagram describing the functionality discussed herein according to an embodiment of the present invention is shown. It is understood that the teachings recited herein may be practiced within any type of computing environment, including, but not limited to, a networked computing environment (e.g., a cloud computing environment 50). A stand-alone computer system/server 12 is shown in FIG. 2 for illustrative purposes only. In the event the teachings recited herein are practiced in a networked computing environment, each client need not have a robot collaboration engine 60 (hereinafter "system 60"). Rather, all or part of system 60 could be loaded on a server or server-capable device that communicates (e.g., wirelessly) with the clients to provide for maneuvering collaborative soft robots to rescue persons in a hydrological disaster. Regardless, as depicted, system 60 is shown within computer system/server 12. In general, system 60 can be implemented as program/utility 40 on computer system 12 of FIG. 1 and can enable the functions recited herein.

Along these lines, system 60 may perform multiple functions similar to a general-purpose computer. Specifically, among other functions, system 60 can navigate vehicles in chained groups to reduce traffic congestion in a networked computing environment. To accomplish this, system 60 can include a set of components (e.g., program modules 42 of FIG. 1) for carrying out embodiments of the present invention. These components can include, but are not limited to, location component 62 for localizing and navigation to a casualty location in a hydrological disaster; assessment component 64 for situational assessment to provide collaboration floatation; and collaboration component 66 for combining soft robots to ensure floatation to provide casualty recovery.

Figure 3A:
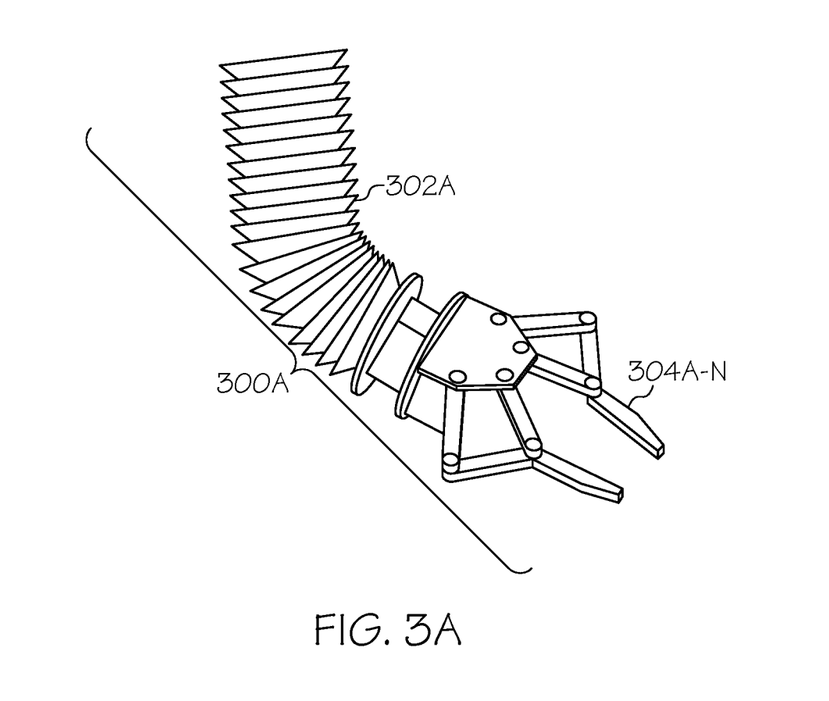
FIGS. 3A-C shows example soft robots according to illustrative embodiments.

FIGS. 3A-C show example robots, particularly soft robots. Soft robots have actuators that differ from their rigid counterparts in that they are made of flexible material which facilitate non-rigid movements like contraction, expansion, bending, etc. As shown, FIG. 3A includes a soft, flexible origami-inspired robot 300A with foldable arm 302A and fingers 304A-N. Foldable arm 302A can include multiple layers of regular polygons (e.g., triangles, hexagons, octagons, eta) forming a tube-like shape of a tower. Foldable arm 302A can help robot 300A overcome access issues by allowing it to reach into confined spaces. The origami-inspired design enables the foldable structure to be lightweight, compact, and scalable while maintaining its kinematic behavior. Fingers 304A-N can be small versions of the towers at one end of foldable arm 302A and manipulated to grasp like opposing fingers.

Figure 3B:
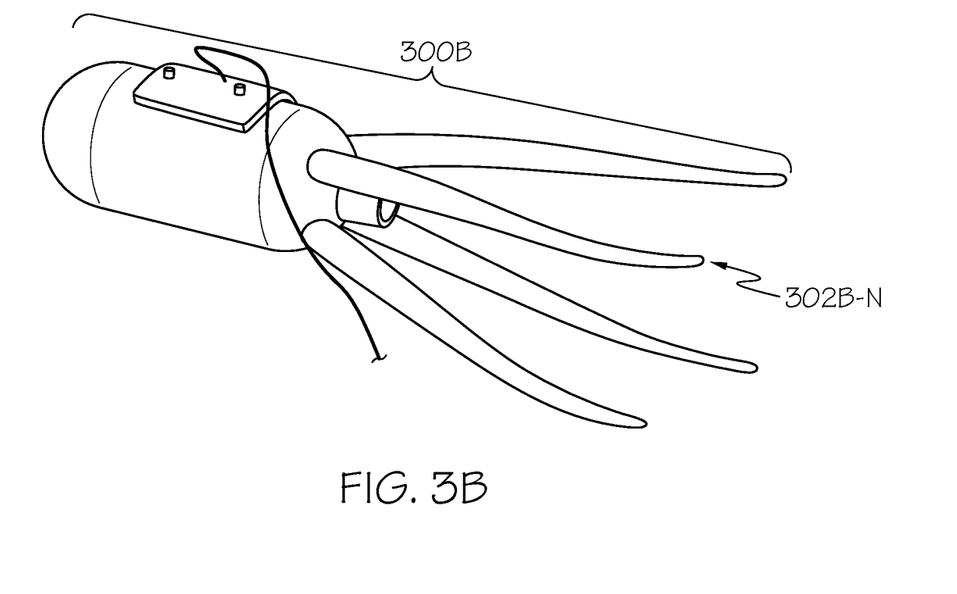

As shown, FIG. 3B includes soft robotic octopus 300B having any number of legs 302B-N. Soft robotic octopus 300B can be made entirely or substantially entirely of relatively soft materials (e.g., silicone gels) of varying rigidity and powered by a chemical reaction that pushes gas through chambers in its rubbery legs 302B-N. Because of this design, soft robotic octopus 300B may not need batteries or wires and can be constructed in a way that contains no rigid components at all. Instead, a sequence of limb movements can be pre-programmed into a sort of circuit board built from tiny pipes. As shown, soft robotic octopus 300B is flexible, and not tethered to anything. Its soft flexible structure can be useful in performing delicate tasks where a more rigid structure might fail, such as being required to maneuver in tight spaces.

Figure 3C:
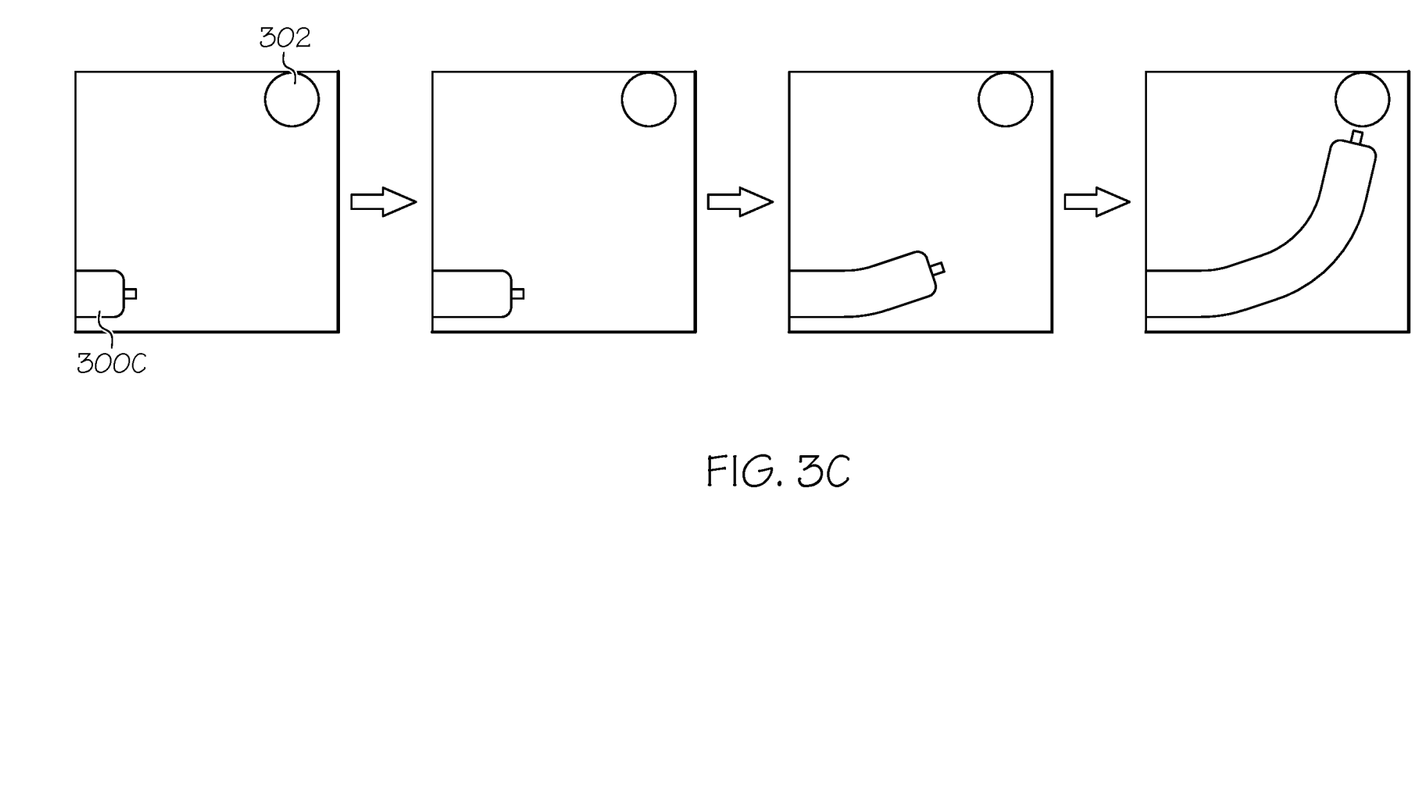

Further, FIG. 3C includes an image sequence depicting an example expandable soft robot 300C reaching target 302C. As shown, expandable soft robot 302C is a small, airtight cylinder. From one end of the cylinder, a tendril can extend like a climbing vine. In some instances, the tip of the tendril can include a camera that can provide a view of an otherwise unreachable space. As shown, expandable soft robot 302C includes a tube of soft material folded inside itself, like an inside-out sock, that expands in one direction when the material at the front of the tube everts, as the tube becomes right-side-out. This design results in movement of the tip without movement of the body. The body lengthens as the material extends from the end, but the rest of the body remains stationary. The body of soft robot 302C can be stuck to the environment or jammed between rocks, but the tip can continue to progress as new material is added to the end. This type of expandable robot can serve a wide range of purposes, particularly in the realm of search and rescue missions.

Figure 4:
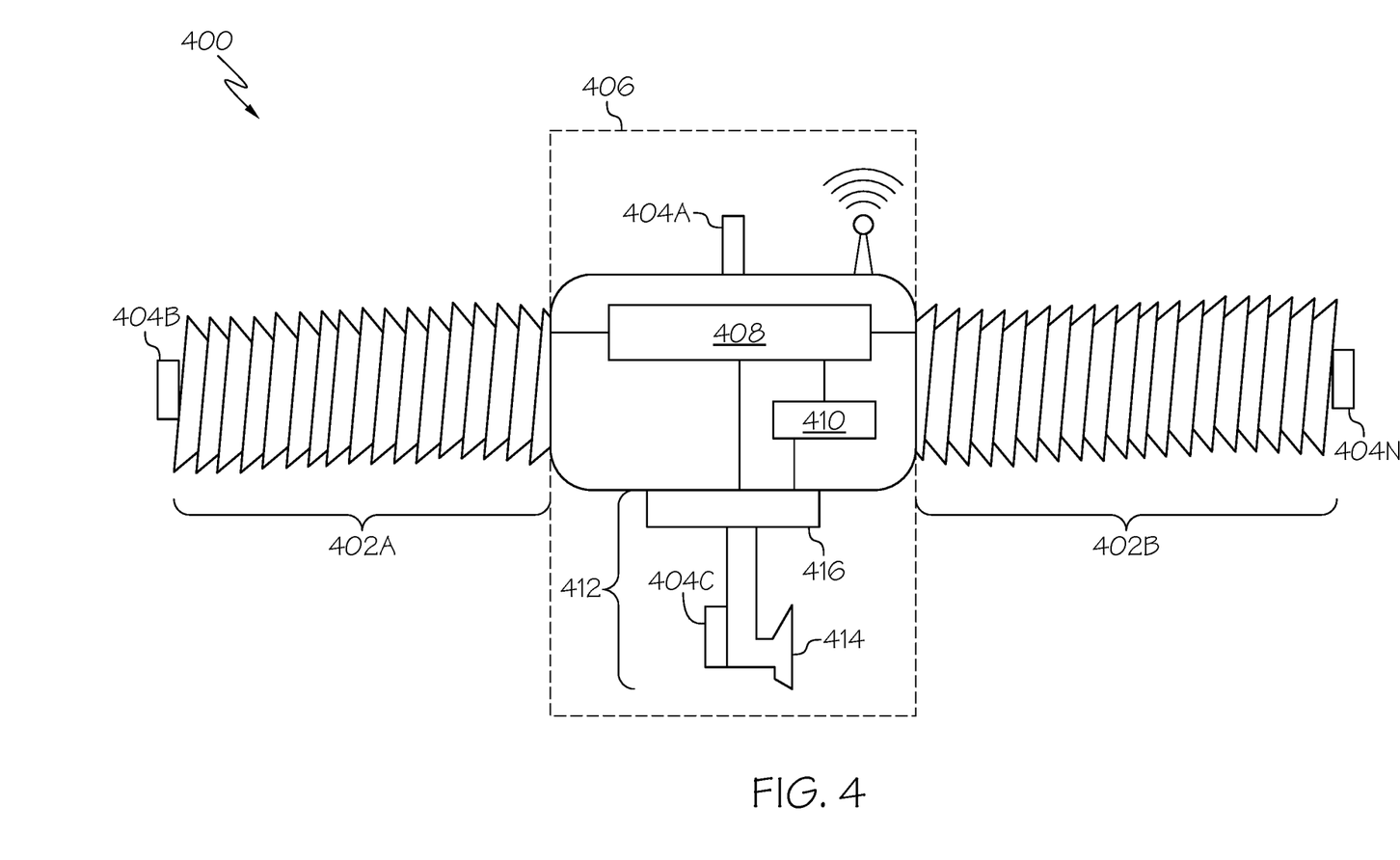
FIG. 4 shows an example soft robot floatation unit according to illustrative embodiments.

FIG. 4 shows an example soft robotic floatation unit (SRFU) 400. As shown, SRFU 400 includes expandable body segments 402A-B, any number of sensor components 404A-N, and fixed body segment 406. Fixed body segment 406 houses the controlling units for expandable body segments 402A-B including grappler component 408, controller component 410, and propulsion unit 412. Propulsion unit 412 includes jet unit 414 mounted on swivel 416 to direct jet unit 414 in a desired direction. Fixed body segment 406 further includes one or more sensor components 404A-N for detecting and localizing signs of life.

Figure 5:
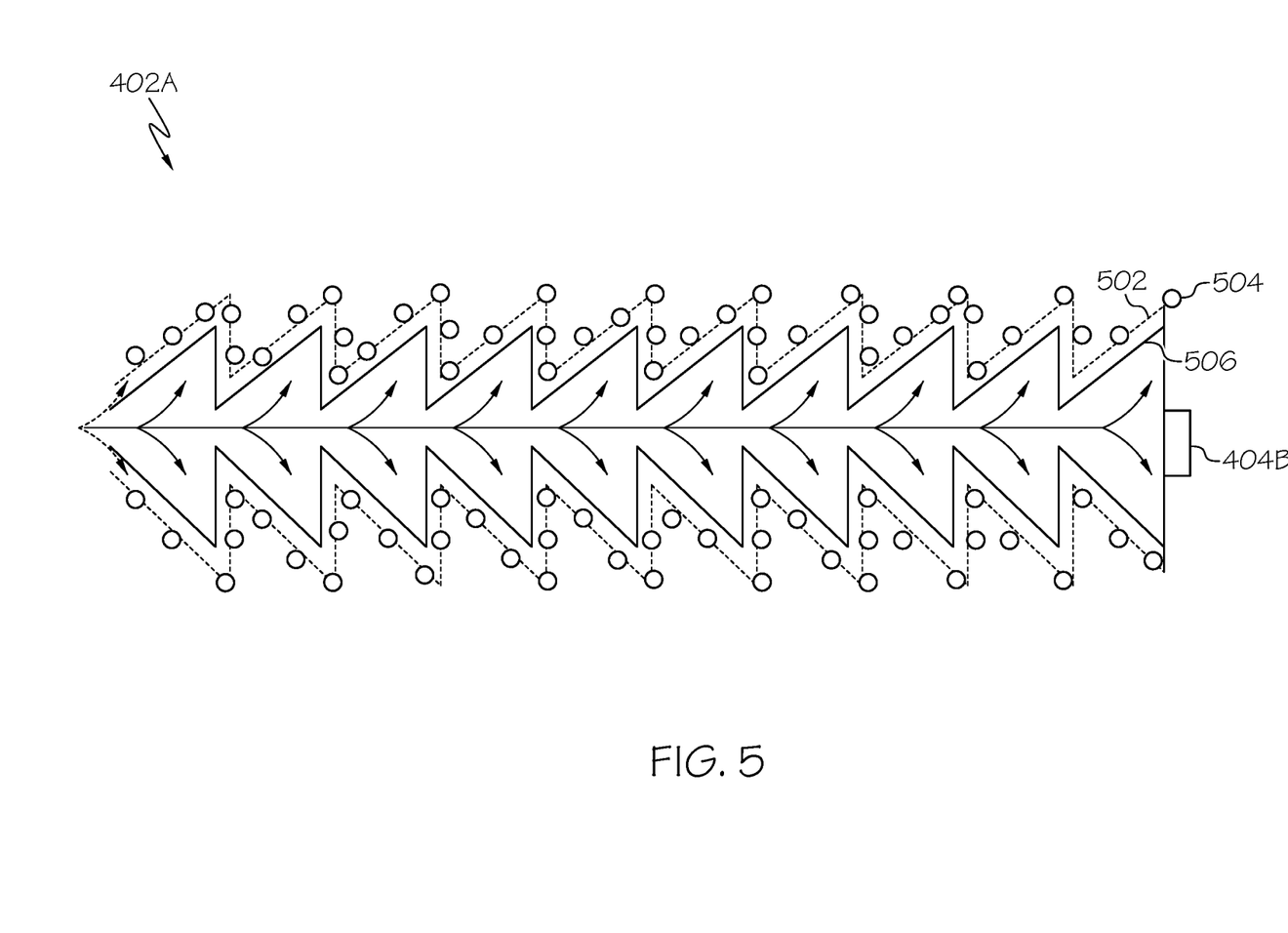
FIG. 5 shows an example expandable body segment according to illustrative embodiments.

FIG. 5 shows example expandable body segment 402A. Expandable body segment 402B is identical or nearly identical to expandable body segment 402A. Expandable body segment 402A can be composed of elastic material such as rubber, plastic, and/or the like, which can be stiffened by inflation to support a person holding onto it to keep the person afloat in a hydrological disaster. Gradual inflation of expandable body segment 402A unfolds and stiffens the segment, while gradual suction folds it back along the lines of origami fold lines, thus packing it back.

In an embodiment, expandable body segment 402A can be double-lined to allow for selective inflation of a thin jacket (e.g., a marked directionality jacket 502 is shown in FIG. 5) on a side to allow a change in a bending direction of the segment. Expandable body segment 402A can include any number of electromagnetic grains (e.g., grain 504) for surface grappling. Each grain is composed of a flexible material (e.g., copper strip, conductive paint, etc.) and embedded on an outer surface of expandable body segment 402A. In an embodiment, grappler component 408 can actuate or cause to operate one or more electromagnetic grains, as per the instructions from controller component 410.

In an embodiment, controller component 410 can provide instructions to propulsion unit 412 to control the movements of SRFU 400. As previously mentioned, controller component 410 can also provide instructions to grappler component 408 to expand or contract an expandable body segment (e.g., 402A-B), along with instructions as to when and which grains to be made magnetic or non-magnetic on the expandable body segment. Actuating grains on an expandable body segment (e.g., 402A-B) enables surface grappling. Surface grappling (or mating) includes actuating (i.e., making magnetic or non-magnetic) the electromagnetic grains on an expandable body segment of two opposing soft robots in order to connect the two magnetically. This process can be done any number of times to connect any number of soft robots to assist in a rescue of persons by keeping persons afloat until being secured by rescue personnel.

In an embodiment, propulsion unit 412 can facilitate water-jet and/or air-jet propulsion. In either case, jet unit 414 mounted on swivel 416 gives out a jet stream (e.g., water or air) that makes the SRFU 400 move in a direction opposite the jet stream. Swivel 416 can be controlled by controller component 410 enabling propulsion in any direction in a horizontal plane. Further, in an embodiment, grappler component 408 can expand/contract the expandable body selectively and also enable/disable electromagnetic surface grappling as per instructions from controller component 410.

In an embodiment, SRFU 400 can include any number of sensor components 404A-N. A sensor unit can include an audio sensor, visual sensor, thermal sensor, acoustic sensor, etc., and/or any sensor combination to detect and localize any signs of life. Sensor data from sensor components 404A-N can be received by controller component 410 and, based on the sensor data, controller component 410 can transmit instructions to propulsion unit 412 to move SRFU 400 and/or grappler component 408 for water surface grappling.

Referring back to FIG. 2, navigation component 62, as performed by computer system/server 12, is configured to coordinate movement of a set of soft robots (e.g., SRFU 400) having been released in a body of water to seek out victims for rescue in a hydrological disaster. Navigation component 62 instructs the soft robots to spread out in order to search for victims. The search can be boot-strapped by leveraging potential areas of victim concentration obtained from cell tower records, aerial surveys, etc. The soft robots can divide their population proportional to victim concentration and seek these potential locations using cooperative foraging techniques, either now known or later developed. When an object in the water is discovered, life signs for a potential victim are verified through individual life sign opinions arrived at through a correlation of multi-modal sensing, such as heat signatures (e.g., shows hot if object/entity is alive), movement authenticity (i.e., whether the object is moving voluntarily), skin coloration, etc. Nearby soft robots can relocate and bend their expandable body segments depending on their energy reserves (e.g., battery life) to provide data for consensus. The data can be shared with other soft robots in the vicinity which can also observe the same object to obtain a consensus. A victim, once identified, can be localized using onboard depth cameras (e.g., stereo, time-of-arrival). Further, a relative localization of the SRFUs are performed and each SRFU will thus know the relative location of an identified victim using the soft robot making the discovery as reference.

Assessment component 64, as performed by computer system/server 12, is configured to provide a situational assessment for collaborative floatation. A single soft robot (e.g., SRFU 400) might be insufficient if the number of victims is more than the single soft robot can keep afloat. Once victims are identified, assessment component 64 can estimate a number of such victims and their distributions. In an embodiment, a distributed situational awareness assessment is performed with the knowledge of victims acquired so as to divide the workforce of soft robots appropriately to ensure that sufficient units are deployed to cater to the victim concentration. The units then are recruited to various victim locations based on their available battery resources to assist victims.

In another embodiment, if multiple victims are identified by a soft robot (e.g., SRFU 400), then the soft robot making the discovery can send out a recruitment beacon. The recruitment beacon is an electronic signal that is collected by all soft robots within range of the beacon and a distribution assignment is performed centrally based on how much load each soft robot can handle alone or in formation with other soft robots, along with the amount of energy needed by each soft robot to get to the requested location. Once an assignment is made, the soft robots are moved into position for help.

Figure 6:
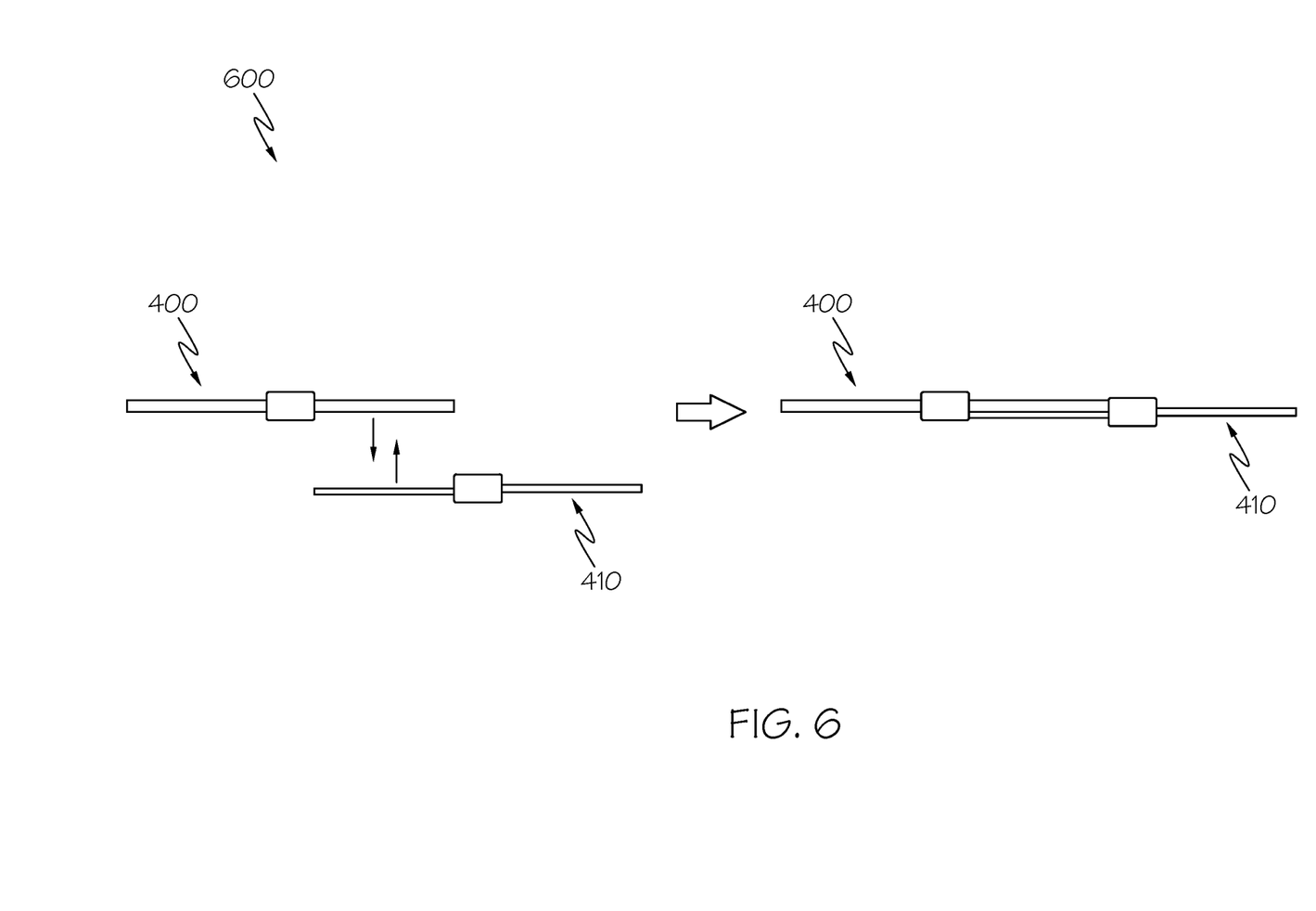
FIG. 6 shows two soft robots navigating towards each other to connect according to illustrative embodiments.

Collaboration component 66, as performed by computer system/server 12, is configured to combine any number of soft robots to ensure floatation of plurality of persons needing rescue in a hydrological disaster. Each soft robot (e.g., SRFU 400) moved into location of a victim can initiate an extension of its expandable body segments up to a threshold so as to increase the probability of connecting with another soft robot to enable surface grappling. To enable surface grappling between two soft robots, each of the two soft robots must enable surface magnets on their expandable body segments. FIG. 6 shows SRFU 400 and SRFU 410 navigating towards each other such that each target their counterpart's expandable body segment in order to connect, or mate.

Once the expandable body segments of a pair of soft robots have connected, a three-step sliding maneuver can be performed. First, a best cross-sectional area computation is calculated. A water current velocity is calculated ($V_w$) using a water flow sensor of SRFU 400. The velocity of SRFU 400 ($V_b$) is obtained from an onboard sensor. Variable v is calculated ($V_b-V_w$) for use in a fluid dynamic drag force equation to determine a best cross-sectional area of SRFU A* which keeps the drag force D within a predefined acceptable threshold ($D_t$): $A^*=(2\times D_t)/(Cpv^2)$. Constants C and p are explained below.

The second step includes computing a body area change of SRFU 400. SRFU 400 is modeled as a cylinder having a surface area with a sum of the longitudinal area ($A=2\pi rL$) and a radial area at the edges ($2\pi r^2$) where L is the body length and r is the radius. If the longitudinal surface of SRFU 400 is experience drag (i.e., when the water current is angled towards the body of SRFU 400), a change in the length required for SRFU 400 is calculated as follows: $\Delta L=(A^*-A)/(2\pi r)$, using the current at the moment, area A, and radius r. If the radial area is experience drag (i.e., when body of SRFU 400 is parallel the current), a change in the radius required for SRFU 400 is calculated as follows: $\Delta R=SQRT[(A^*-A)/(2\pi)]$. If the drag is angled on both surfaces, then both previous equations are used. When multiple soft robots (e.g., N soft robots) are already connected to one another, then ($\Delta L$, $\Delta R$) is computed for the entire length of the attached soft robots and adjustments of length are performed ($\Delta L/N$) and each soft robot applies the change of $\Delta R$.

Figure 7:
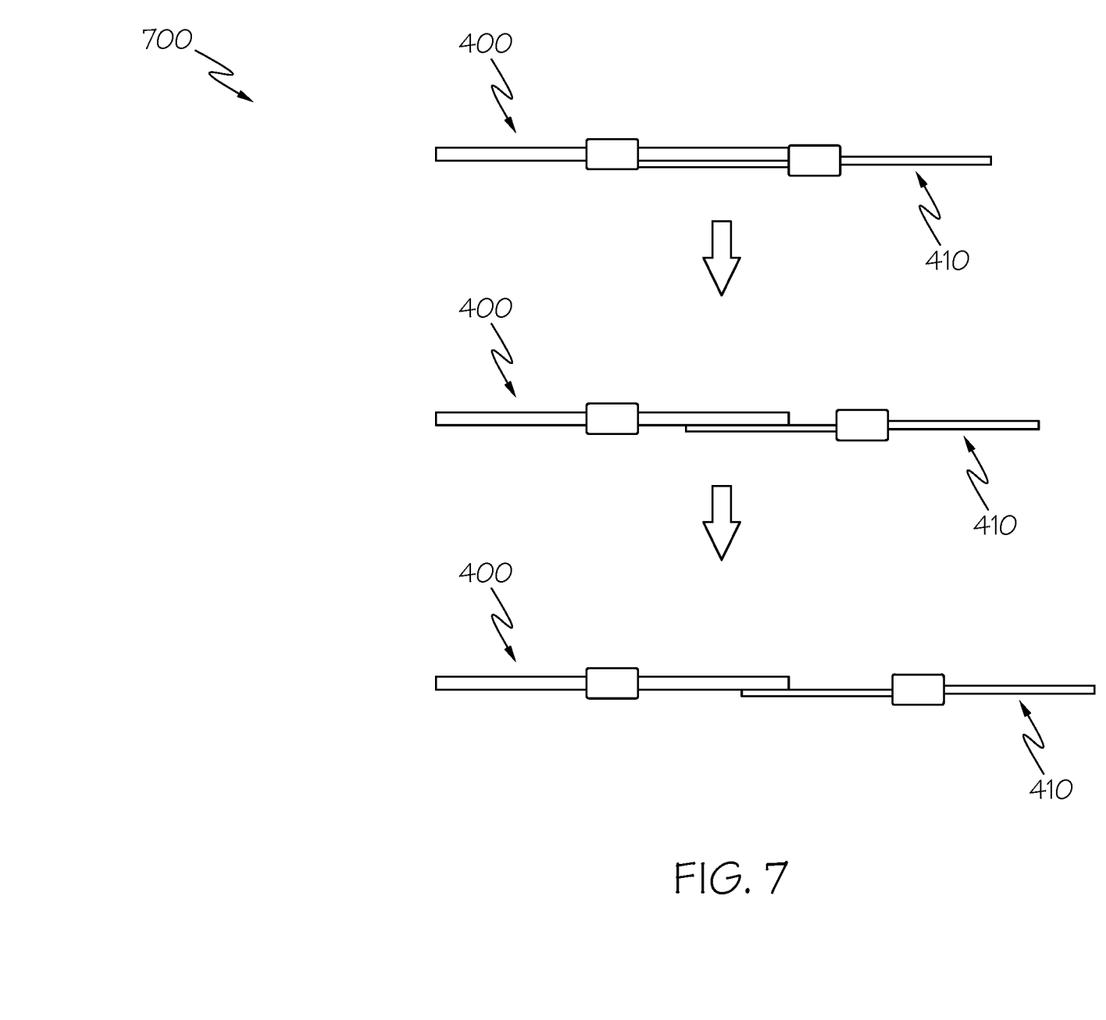
FIG. 7 shows an example sliding maneuver involving two soft robots according to illustrative embodiments.

The third step includes adapting a body area of SRFU 400. FIG. 7 shows an example sliding maneuver between SRFU 400 and SRFU 410. To that end, the electromagnetic grains of SRFU 400 and SRFU 410 are disengaged. SRFU 400 and SRFU 410 slide in opposite directions (to extend) until $\Delta L$ is achieved if $\Delta L>0$ and slide towards each other (to contract) until $\Delta L$ is achieved if $\Delta L<0$. The electromagnetic grains are engaged again to restore mating. The process can be repeated any number of times to increase the arm length of the formation as shown in FIG. 7. Finally, once victims hold onto the formation, distress beacons can be sent out to alert search teams where to hone in and rescue the victims. Until then, the victims can be kept afloat by the formation.

Figure 8:
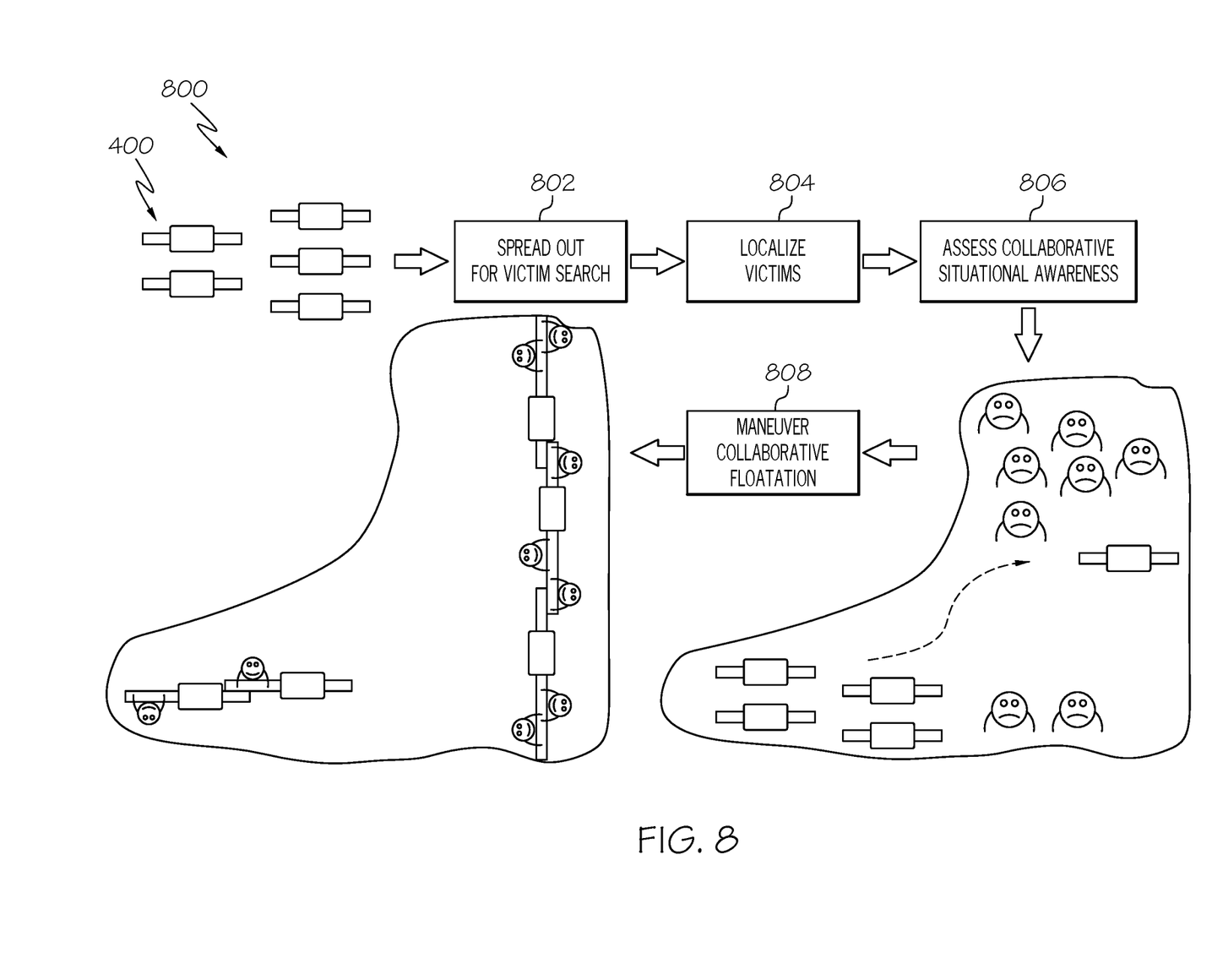
FIG. 8 shows a process flowchart for maneuvering collaborative soft robots to rescue persons in a hydrological disaster according to illustrative embodiments.

As depicted in FIG. 8, in one embodiment, a system (e.g., computer system/server 12) carries out the methodologies disclosed herein. Shown is a process flowchart 800 for maneuvering collaborative soft robots to rescue persons in a hydrological disaster. In a hydrological disaster situation (e.g., a flood), a plurality of soft robots (e.g., SRFU 400) are set free in water (e.g., the flood zone). At 802, navigation component 62, as performed by computer system/server 12, causes the soft robots to spread out and seek victims to keep them afloat until help arrives. The soft robots can reach places which are difficult for even a boat crew to reach, such as narrow water alleys which flood easily during such disaster scenarios. The search can use cooperative foraging techniques within resource constraints. Relative localization can be performed between the units to ensure infrastructure-less coordination. The step can be boot-strapped with past call records, network traffic, and/or the like, to make the search more efficient.

At 804, navigation component 62 locates the victims using sensing techniques and communicates to the other soft robots. At 806, assessment component 64, as performed by computer system/server 12, provides a situational assessment for collaborative floatation. A distributed situational awareness drill can be performed with the knowledge of victims acquired so as to divide the workforce of the soft robot units to ensure that sufficient units are deployed to cater to the victim concentration. The units then are recruited to various victim locations based on their available resources (e.g., remaining battery power, etc.) and seek out victim locations.

At 808, collaboration component 66, as performed by computer system/server 12, combines any number of soft robots to ensure floatation of a number of persons needing rescue in a hydrological disaster. As shown, victims are localized in two separate areas. Soft robots are deployed in adequate numbers to provide rescue based on a situational assessment. The soft robots can perform coordinated maneuvers to grapple each other's expandable body segments and slide along them to extend their lengths to support floatation of more victims. Once done, a soft robot can send a distress beacon for extraction of the victims.

Process flowchart 800 of FIG. 8 illustrates the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for maneuvering collaborative soft robots to rescue persons in a hydrological disaster. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for maneuvering collaborative soft robots to rescue persons in a hydrological disaster. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is apparent that there has been provided herein approaches to navigate vehicles in chained groups to reduce traffic congestion. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for maneuvering collaborative robots for a rescue mission, the method comprising:
dispersing, to perform a search for persons needing rescue, a plurality of robots in a body of water;
receiving, from a robot among the plurality of robots using sensing techniques, a location of a plurality of persons;

performing, based on the number of persons and the location, a situational assessment to derive a number of robots to deploy to the location;

deploying, consistent with the derived number, additional robots to the location; and directing a plurality of the deployed robots to create a connected floatation unit to support floatation of the plurality of persons.

2. The computer-implemented method of claim 1, wherein the robot is a soft robot and includes an expandable body segment, a plurality of sensor components, and a fixed body segment.

3. The computer-implemented method of claim 2, wherein the expandable body segment is embedded with a plurality of electromagnetic grains.

4. The computer-implemented method of claim 3, wherein creating a connected floatation unit includes connecting a first soft robot and a second soft robot by selectively actuating the plurality of electromagnetic grains on an expandable body segment of the first soft robot and the electromagnetic grains of an expandable body segment of the second soft robot.

5. The computer-implemented method of claim 4, wherein connecting the first soft robot and second soft robot includes performing a sliding maneuver to alter a connection length between the expandable body segment of the first soft robot and the expandable body segment of the second soft robot.

6. The computer-implemented method of claim 2, wherein a person among the plurality of persons is detected by assessing sensor data collected from at least one sensor component among the plurality of sensor components.

7. The computer-implemented method of claim 1, further comprising directing all of the deployed robots to create the connected floatation unit.

8. A computer system for maneuvering collaborative robots to rescue persons in a hydrological disaster, the computer system comprising:

a memory medium comprising program instructions;

a bus coupled to the memory medium; and a processor, for executing the program instructions, coupled to a chain navigation engine via the bus that when executing the program instructions causes the system to:

disperse, to perform a search for persons needing rescue, a plurality of robots in a body of water;

receive, from a robot among the plurality of robots using sensing techniques, a location of a plurality of persons;

perform, based on the number of persons and the location, a situational assessment to derive a number of robots to deploy to the location;

deploy, consistent with the derived number, additional robots to the location; and direct a plurality of the deployed robots to create a connected floatation unit to support floatation of the plurality of persons.

9. The computer system of claim 8, wherein the robot is a soft robot and includes an expandable body segment, a plurality of sensor components, and a fixed body segment.

10. The computer system of claim 9, wherein the expandable body segment is embedded with a plurality of electromagnetic grains.

11. The computer system of claim 10, wherein creating a connected floatation unit includes connecting a first soft robot and a second soft robot by selectively actuating the plurality of electromagnetic grains on an expandable body segment of the first soft robot and the electromagnetic grains of an expandable body segment of the second soft robot.

12. The computer system of claim 11, wherein connecting the first soft robot and second soft robot includes performing a sliding maneuver to alter a connection length between the expandable body segment of the first soft robot and the expandable body segment of the second soft robot.

13. The computer system of claim 12, wherein a person among the plurality of persons is detected by assessing sensor data collected from at least one sensor component among the plurality of sensor components.

14. The computer system of claim 8, the instructions further causing the system to direct all of the deployed robots to create the connected floatation unit.

15. A computer program product for maneuvering collaborative robots to rescue persons in a hydrological disaster, the computer program product comprising a computer readable hardware storage media, and program instructions stored on the computer readable storage media, that cause at least one computer device to:

disperse, to perform a search for persons needing rescue, a plurality of robots in a body of water;

receive, from a robot among the plurality of robots using sensing techniques, a location of a plurality of persons;

perform, based on the number of persons and the location, a situational assessment to derive a number of robots to deploy to the location;

deploy, consistent with the derived number, additional robots to the location; and direct a plurality of the deployed robots to create a connected floatation unit to support floatation of the plurality of persons.

16. The computer program product of claim 15, wherein the robot is a soft robot and includes an expandable body segment, a plurality of sensor components, and a fixed body segment.

17. The computer program product of claim 16, wherein the expandable body segment is embedded with a plurality of electromagnetic grains.

18. The computer program product of claim 17, wherein creating a connected floatation unit includes connecting a first soft robot and a second soft robot by selectively actuating the plurality of electromagnetic grains on an expandable body segment of the first soft robot and the electromagnetic grains of an expandable body segment of the second soft robot.

19. The computer program product of claim 18, wherein connecting the first soft robot and second soft robot includes performing a sliding maneuver to alter a connection length between the expandable body segment of the first soft robot and the expandable body segment of the second soft robot.

20. The computer program product of claim 15, the instructions that cause the at least one computer device to update further causing the at least one computer device to connect all of the deployed robots to create the connected floatation unit.

* * * * *